Nov. 7, 1961  G. K. EGGERTSSON  3,007,273
FLOAT FOR FISHING NETS AND THE LIKE
Filed June 15, 1959  3 Sheets-Sheet 1
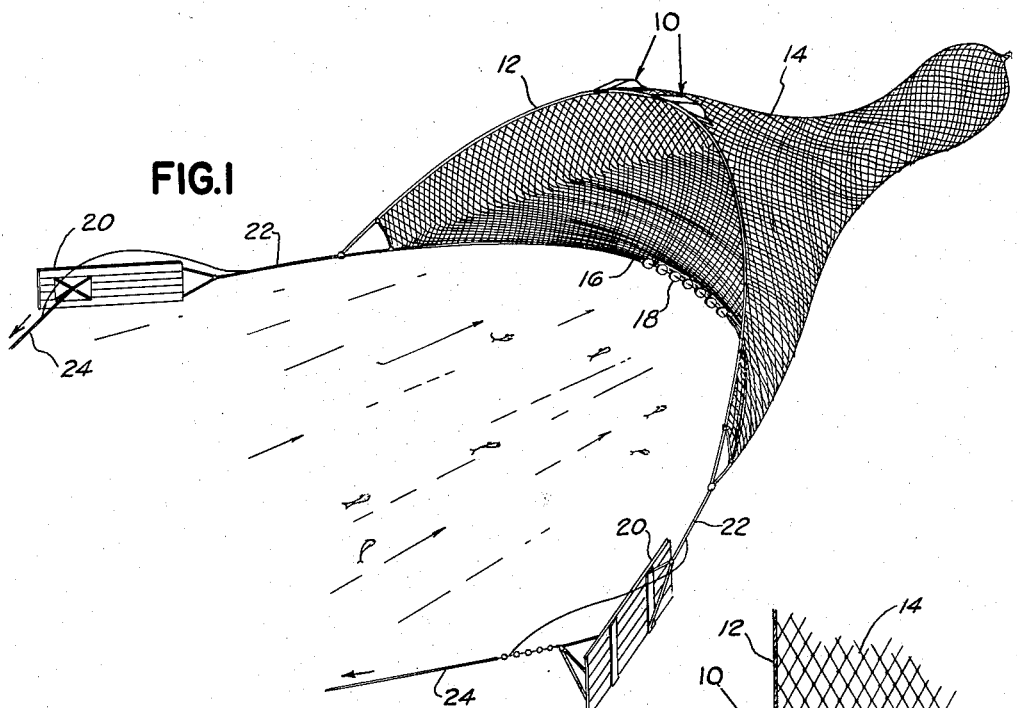
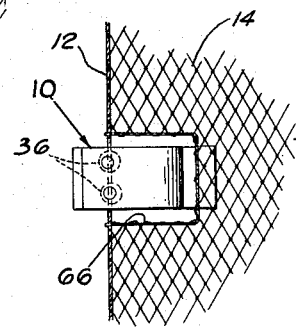
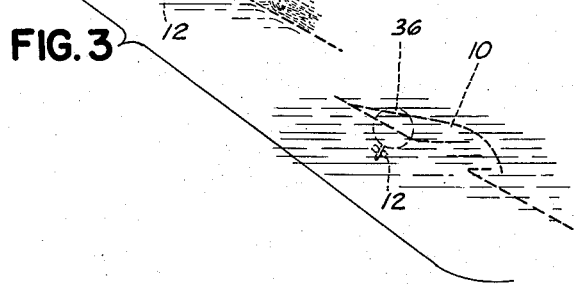
INVENTOR.
Grimur K. Eggertsson
BY Robert R. Churchill
ATTORNEY Nov. 7, 1961  G. K. EGGERTSSON  3,007,273
FLOAT FOR FISHING NETS AND THE LIKE
Filed June 15, 1959  3 Sheets-Sheet 2

INVENTOR.
Grimur K. Eggertsson
BY Robert R. Churchill
ATTORNEY

Nov. 7, 1961  G. K. EGGERTSSON  3,007,273
FLOAT FOR FISHING NETS AND THE LIKE
Filed June 15, 1959  3 Sheets-Sheet 3

INVENTOR.
Grimur K. Eggertsson
BY Robert R. Churchill
ATTORNEY

United States Patent Office 3,007,273
Patented Nov. 7, 1961

3,007,273
FLOAT FOR FISHING NETS AND THE LIKE
Grimur K. Eggertsson, 42 Paine St., Winthrop, Mass.
Filed June 15, 1959, Ser. No. 820,276
12 Claims. (Cl. 43—9)

This invention relates to a float for fishing nets and the like.

The invention has for an object to provide a novel and improved float for fishing nets adapted to be attached to the head rope of a trawl net or the like which is characterized by its ability to maintain a high opening of the net at normal trawling speeds and which is designed to reduce to a minimum the towing power required for dragging the net along the bottom in deep water.

The invention has for a further object to provide a novel and improved float of the character specified which is designed to reduce to a minimum the drag or suction at the rear of the float which is inherent when pulling a submerged object through the water to the end that the power required for pulling the submerged float through the water is greatly reduced.

With these general objects in view and such others as may hereinafter appear, the invention consists in the float for fishing nets and the like as hereinafter described and particularly defined in the claims at the end of this specification.

In the drawings illustrating the preferred embodiment of the invention:

FIG. 1 is a perspective view of a trawl net embodying the present floats attached to the head rope thereof;

FIG. 2 is a plan view detail showing a float attached to the net;

FIG. 3 is a view diagrammatically illustrating successive positions of elevation of the present float connected to a trawl net from a position at rest to a full trawling speed;

Figure 4:
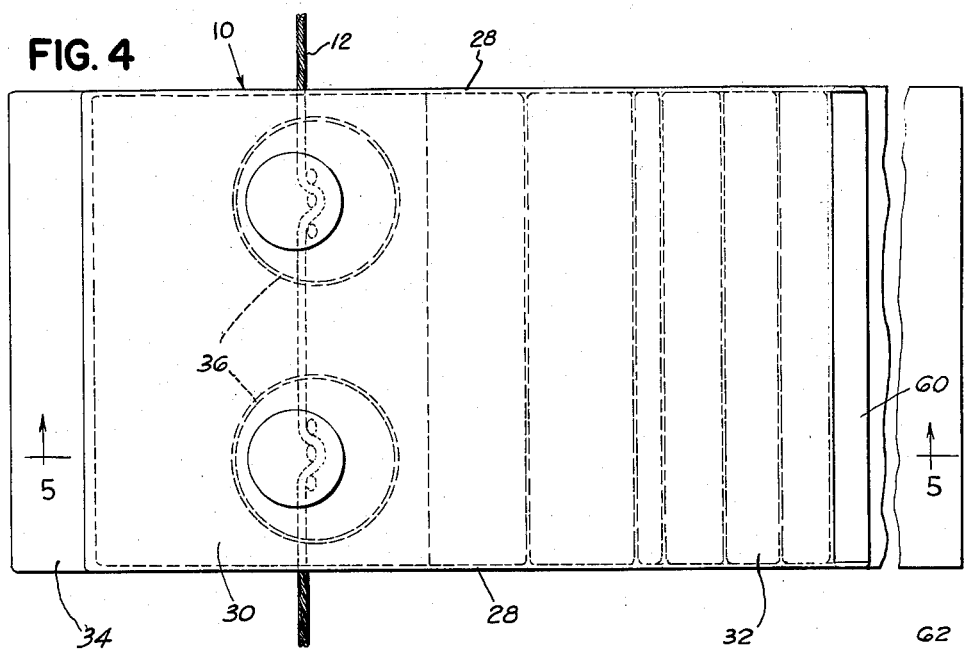
FIG. 4 is a plan view detail of one embodiment of the present float.

In general the present invention contemplates a novel and improved float, herein illustrated as attached to the head rope of a trawl net, which is characterized by structure capable of reducing the drag or suction at the rear of a submerged float being towed through the water and which is also capable of maintaining a high opening of the net at normal trawling speeds and under the pressure of deep water.

Prior to the present invention it has been the practice to employ hollow floats of spherical or cylindrical shape, a plurality of which are secured to the heda rope and to the wings of a fishing net for the purpose of maintaining the net open during the trawling operation. Such prior floats are usually between 6" and 8" in diameter, and the number of such prior floats normally required for this purpose varies with the size of the net and the opening height desired for the species of fish wanted. However, for purposes of comparison, the average number of such prior floats required for a trawl net when fishing for haddock or cod is twenty-four. It is common knowledge that in operating a trawl net equipped with such prior floats under the pressure of deep water that a great amount of towing power is required and that such power requirements are increased by the drag caused by the suction or vacuum behind the submerged floats when moved through the water. Also, it has been found that in use such prior floats tend to be urged in a downward direction when the trawling speed is increased, thus reducing the net opening and resulting in a loss of fish which would normally be in the path of a net with a high opening.

In accordance with the present invention the novel floats are constructed in a manner such as to reduce to a minimum the drag caused by the suction or vacuum on the rear surface of the submerged float as it is pulled through the water whereby to reduce the towing power requirements to a minimum. The structure of the present floats also tends to increase the elevation of the head rope as the towing or trawling speed is increased. Furthermore, the efficiency of the present float is such that only one or two floats are required for each net in place of the usual twenty-four or more of the prior floats.

Referring now to the drawings, the present improved floats are indicated generally at 10 and are shown as connected to the head rope 12 of a conventional trawl net 14 designed to be drawn along the bottom of the sea and to trap any fish in the path thereof. As herein shown, the foot rope 16 is provided with rollers 18 and the net is provided with the usual trawl doors 20 connected by ground wires 22 to the wings of the net. The doors 20 are in turn connected to the towing warps 24 leading to the towing vessel.

Figure 5:
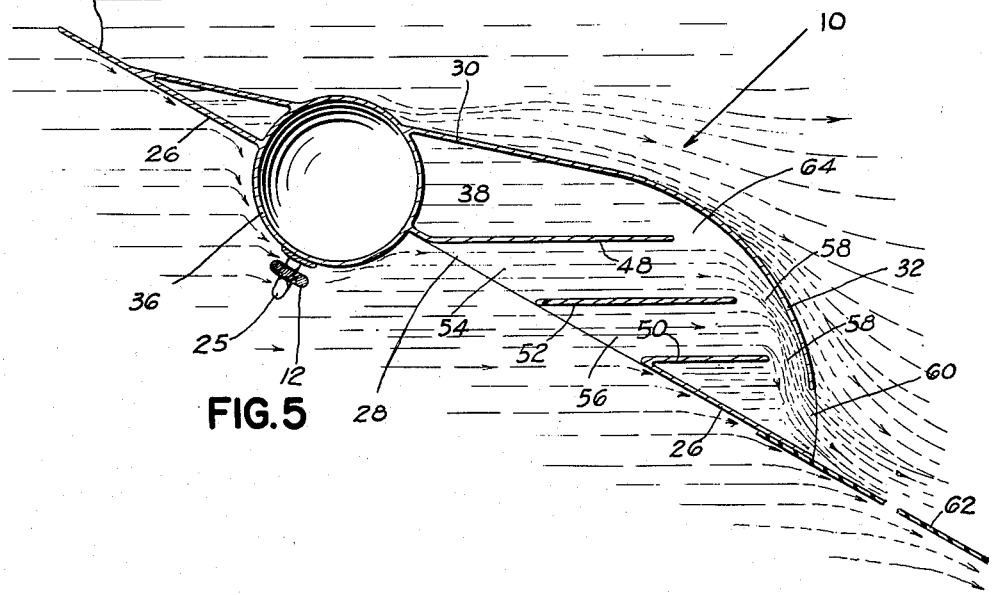
FIG. 5 is a vertical cross section taken on the line 5—5 of FIG. 4.

As illustrated in detail in FIGS. 4 and 5, the present float 10 comprises a hollow sheet metal structure generally rectangular in plan, as shown in FIG. 4, and in side elevation the hollow structure is provided with a flat bottom wall 26, straight side walls 28 and an inclined top wall defining a forwardly tapering or wedge shaped forward portion 30 and a generally curved rear portion 32. The bottom wall 26 extends forwardly of the intersection of the upper wall portion 30 therewith for a short distance providing a forwardly extended blade portion 34. The forward end of the hollow structure is also provided with a pair of spaced hollow float balls 36 which may be formed integrally with or welded to the bottom and top walls 26, 30. As shown in FIG. 5, the lower half of each ball extends below the bottom wall 26 and is provided with a U-shaped fastener 25 to which the head rope 12 is secured. The upper half of each ball 36 extends through the chamber 38 of the hollow structure and a short distance beyond the top wall 30 thereof, as shown. The float balls 36 are disposed a short distance rearwardly of the point of intersection of the top and bottom walls at the forward end of the structure, and immediately beyond the float balls in a rearward direction the bottom wall is bent inwardly at an angle to form the upper wall 48 of an inlet communicating with the interior of the structure. The lower wall of the inlet also comprises an inwardly bent portion 50 of the bottom wall, each of said inlet walls extending in a parallel relation and at an angle of about thirty degrees with respect to the line of the bottom wall as shown. An intermediate plate 52 disposed between and parallel to the upper and lower walls 48, 50 serves to provide separate upper and lower inlet compartments 54, 56, respectively.

Each inlet wall 48, 50 and the intermediate plate 52 extends across the full width of the hollow structure and are secured to the side walls 28. Also, each inlet wall and plate terminates short of the curved rear wall portion 32 to provide passageways 58 for the water entering the inlets 54, 56, and the curved rear wall portion 32 is provided with and opening 60 at its lower end through which the water passing through the passageways may escape. The rear opening 60 extends the full width of the structure, and a flap 62 of rubber or like flexible material, also extending the full width of the structure, is secured to and extends rearwardly of the bottom wall as illustrated.

In operation the float 10 will assume an angular position when submerged and secured to the head rope in towing position, as shown in FIG. 5, so that the bottom wall 26 will extend downwardly and rearwardly from the forward end at an angle of approximately 60° with respect to the vertical, thus disposing the inlets 54, 56 substantially horizontally as shown. As the float is moved forwardly in the water during the towing operation, the water is forced through the inlets 54, 56 and passageways 58 to escape through the rear opening 60. The combined area of the inlets 54, 56 is substantially greater than the area of the escape outlet 60 so that the water entering the inlet is increased in velocity as it passes through the relatively smaller rear opening. As a result, any vacuum created at the rear of the float behind the curved surface 32 is counteracted by the faster flow of the water escaping from the outlet 60 to fill the vacuum and thus reduce to a minimum the usual drag encountered when moving a submerged object through the water. As a result, the power required for towing the trawl net and the floats is reduced accordingly.

It will be observed that the forward portion of the chamber 38 is open to the water through the passageway 64 whereby the internal and external pressures are equalized so that the hollow structure is not subject to collapse when used in deep water. The float balls 36 may comprise the usual spherical floats which are designed to withstand such pressure. The flap 62 is provided to stabilize the movement of the float 10 as it is towed through the water. As illustrated in FIG. 2, the net may be provided with an open portion 66 to provide clearance for free movement of the float.

The position of the float balls 36 relative to the center of gravity of the hollow structure is such that the float 10 will assume the angular position as described when the float is at rest, and such inclined position will tend to urge the float upwardly when the towing operation is started and to increase the elevation of the float as the towing speed is increased. This feature is diagrammatically illustrated in FIG. 3 wherein three different positions of elevation are shown, the lowermost position indicating the float at rest; the intermediate position indicating the float as the trawling operation is started; and the uppermost position indicating the elevation of the float at full trawling speed. As a result, the head rope 12 is elevated to keep the net fully open at all times during the trawling operation. In practice the horizontal position of the inlets 54, 56 with relation to the inclined position of the bottom wall 26 tends to maintain the hollow structure in its inclined position when the water passes through the inlets during the towing operation. The average towing speed for a trawl net is about four miles per hour.

The size and proportions of the present float may vary. However, as an example of a preferred size, the illustrated float measures about 20" in width and about 40" in length. The stabilizing flap may extend a suitable length beyond the back end of the float for efficient operation.

Figure 6:
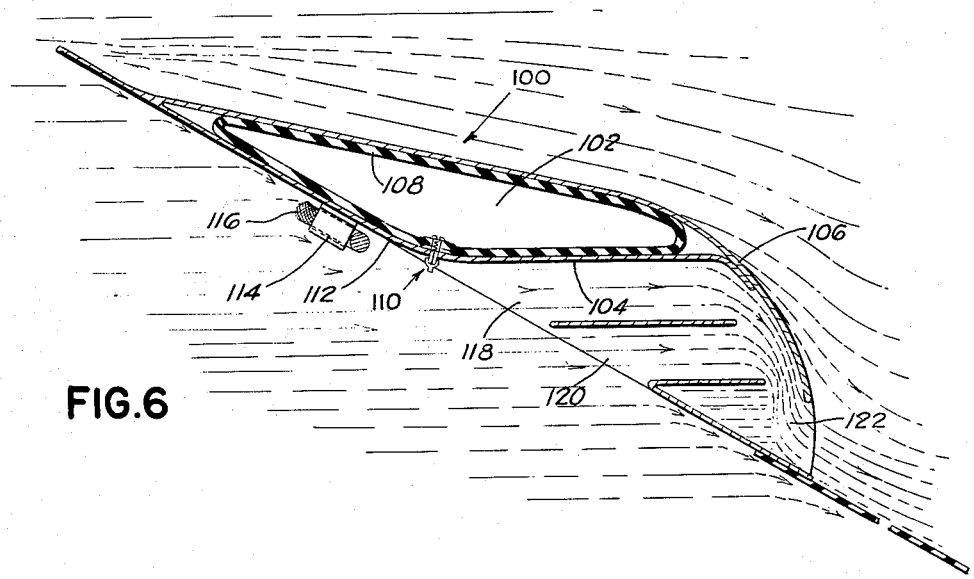
FIG. 6 is a modified form of the float illustrated in FIG. 5.

Referring now to FIG. 6 illustrating a modified form of the invention, the float 100, therein shown, may comprise a structure similar to that shown in FIG. 5 except that the spherical float balls are eliminated and the forward compartment 102 is sealed off by the wall 104 defining the upper wall of the inlet, said wall being extended and secured to the rear curved wall 106 of the hollow structure. Prior to sealing the forward compartment an inflatable member, such as a rubber or like tube or bag 108, is placed within the compartment, the inflatable member having a valve indicated generally at 110, extended through and secured to the bottom wall 112 as shown. In operation the bag 108 is inflated with compressed air to a pressure providing the buoyancy desired. In practice the inflated member also serves to resist collapse of the sealed forward compartment 102 under the pressures encountered in deep water.

The bottom wall 112 may be provided with a fastener 114 secured thereto at a point below the sealed compartment 102 and to which the head rope 116 may be attached. In operation the modified form of float shown in FIG. 6 assumes an angular position when attached to the head rope and submerged in the water, and when moved forward during the towing operation the buoyancy of the float and the inclined position thereof will tend to effect elevation of the float to maintain the net in an open position. Also, the large volume of water entering the inlets 118, 120 and passing through the relatively smaller outlet 122 at an increased velocity will counteract the suction at the back of the float in the manner described.

The float structure herein described as being of sheet metal may be constructed of other suitable materials, such as plastic. Also, the float may be used with nets other than fishing nets, including mine sweepers and the like.

From the above description it will be seen that the present float is constructed in a manner such as to be capable of counteracting the suction created behind the float when being towed through the water and is also capable of increasing its height from the bottom as it is moved forward.

While the preferred embodiment of the invention has been herein illustrated and described, it will be understood that the invention may be embodied in other forms within the scope of the following claims.

Having thus described the invention, what is claimed is:

1. A float for fishing nets and the like comprising an elongated hollow wedge shaped structure having buoyant means at its forward end arranged to balance the hollow structure in a diagonal position inclined downwardly from its forward end with respect to a horizontal plane when submerged, said hollow structure having a bottom wall, a top wall and a rear wall, said bottom wall having a relatively large inlet formed intermediate the ends thereof in communication with the interior of the hollow structure, and said rear wall having a relatively smaller escape outlet through which the water escapes at an increased velocity whereby to counteract the suction at the rear of the float when pulled through the water, and fastening means connected at the buoyant end adapted for securing the float to a net.

2. A float as defined in claim 1 wherein the inlet is formed in a manner such as to cause the float to maintain said downwardly inclined diagonal position with respect to a horizontal plane during its forward movement whereby the float will ride upwardly in the water to an elevated position during said forward movement.

3. A float as defined in claim 1 wherein the bottom wall of the wedge shaped structure is flat, the side walls are straight and at right angles to the bottom wall, and the top wall is inclined upwardly and rearwardly from the forward end for a portion of its length and is provided with a downwardly curved portion to provide said rear wall.

4. A float as defined in claim 3 wherein the inlet is defined by portions of the bottom wall having an inward bend such as to assume a horizontal position when the bottom wall assumes said diagonal position.

5. A float as defined in claim 4 wherein the inlet is provided with an intermediate plate parallel to the portions defining the inlet, said intermediate plate and the portions defining the inlet terminating short of the downwardly curved portion defining the rear wall and providing passageways leading to said outlet.

6. A float as defined in claim 1 which includes an elongated flexible stabilizing flap connected to and extended from the bottom wall of the float.

7. A float for fishing nets and the like comprising an elongated hollow wedge shaped structure having buoyant means at its forward end arranged to balance the hollow structure in a diagonal position inclined downwardly from its forward end with respect to a horizontal plane when submerged, said hollow structure having a bottom wall, a top wall and a rear wall, said bottom wall having a relatively large inlet formed intermediate the ends thereof and in communication with the interior of the hollow structure, and said rear wall having a relatively smaller escape outlet through which the water escapes at an increased velocity whereby to counteract the suction at the rear of the float when pulled through the water, the interior of the hollow structure being entirely open to the surrounding water to equalize the internal and external pressrues, said buoyant means comprising a pair of hollow spherical balls formed integrally with the top and bottom walls of the structure, and fastening means connected at the buoyant end adapted for securing the float to a net.

8. A float for fishing nets and the like comprising an elongated hollow wedge shaped structure having a forward end and having buoyant means at its forward end arranged to balance the hollow structure in a diagonal position inclined downwardly from said forward end with respect to a horizontal plane, when submerged, said hollow structure having a bottom wall, a top wall and a rear wall, said bottom wall having a relatively large inlet in communication with the interior of the hollow structure, and said rear wall having a relatively smaller escape outlet through which the water escapes at an increased velocity whereby to counteract the suction at the rear of the float when pulled through the water, said forward end being arranged to form a sealed compartment, said buoyant means comprising an inflated member disposed within said compartment.

9. The combination with a trawl net of the character described, of one or more floats adapted to be secured to the head rope of said net, said net having openings adjacent the head rope to provide freedom of movement of the floats, each float comprising an elongated hollow wedge shaped structure having buoyant means at its forward end and arranged to assume a diagonal position inclined downwardly from its forward end with respect to a horizontal plane when submerged whereby to cause the float to ride upwardly to open the net wide during the trawling operation, said hollow structure having a bottom wall and a rear wall, said bottom wall having a relatively large inlet formed intermediate the ends thereof and communicating with the interior of the structure, and said rear wall having a relatively smaller escape outlet through which the water escapes at an increased velocity whereby to counteract and reduce to a minimum the suction at the rear of the float when pulled through the water, and fastening means connected at the buoyant end for securing the float to the net, the trailing end of the float being free of connection to the net.

10. A float for fishing nets and the like comprising an elongated hollow structure having buoyant means at its forward end and arranged to assume a diagonal position inclined downwardly from its forward end with respect to a horizontal plane when submerged, said hollow structure having a flat bottom wall, a top wall and a curved rear wall, coextensive with said top wall, said bottom wall having a relatively large inlet intermediate its ends communicating with the interior of the hollow structure, said inlet being defined by transverse walls extending inwardly and angularly from said bottom wall and terminating short of said curved rear wall providing passageways therebetween, and said rear wall having a relatively smaller escape outlet communicating with said passageways and through which the water escapes at an increased velocity whereby to counteract and reduce to a minimum the suction at the rear of the float when pulled through the water.

11. A float for fishing nets and the like comprising an elongated wedge shaped structure having a forward end, buoyant means at said forward end arranged to balance the elongated structure so that the float will assume a downwardly inclined position from its forward end with respect to a horizontal plane when submerged, said hollow structure having a bottom wall, a top wall and a rear wall, said top and bottom walls merging at the forward end of the wedge shaped structure to provide a forwardly extended blade portion, said bottom wall having a relatively large inlet intermediate the ends thereof defined by portions of the bottom wall having an inward bend, said portions arranged to assume a horizontal position when the bottom wall assumes said inclined position, said rear wall having a relatively smaller escape outlet through which the water entering said inlet escapes when the submerged float is pulled through the water, and an elongated flexible stabilizing flap connected to and extended from the bottom wall of the float.

12. A float as defined in claim 10 within the flow of water through said inlets is diverted downwardly by said curved rear wall to escape through said outlet.

References Cited in the file of this patent

FOREIGN PATENTS

| | | |
|---|---|---|
| 150,858 | Australia | Apr. 13, 1953 |
| 294,695 | Great Britain | July 30, 1928 |
| 305,287 | Great Britain | Feb. 7, 1929 |